United States Patent
Saija

(10) Patent No.: US 10,356,580 B2
(45) Date of Patent: Jul. 16, 2019

(54) CONFIGURATION OF A DEVICE

(71) Applicant: TeliaSonera AB, Stockholm (SE)

(72) Inventor: Timo Saija, Espoo (FI)

(73) Assignee: TELIA COMPANY AB, Stockholm (SE)

( * ) Notice: Subject to any disclaimer, the term of this patent is extended or adjusted under 35 U.S.C. 154(b) by 115 days.

(21) Appl. No.: 14/926,451

(22) Filed: Oct. 29, 2015

(65) Prior Publication Data
US 2016/0128108 A1    May 5, 2016

(30) Foreign Application Priority Data

Oct. 31, 2014    (EP) .................................... 14191295

(51) Int. Cl.
*H04W 4/00* (2018.01)
*H04W 4/50* (2018.01)
*H04W 4/70* (2018.01)
*H04W 76/11* (2018.01)
*H04W 84/18* (2009.01)

(52) U.S. Cl.
CPC .............. *H04W 4/50* (2018.02); *H04W 4/70* (2018.02); *H04W 76/11* (2018.02); *H04W 84/18* (2013.01)

(58) Field of Classification Search
CPC ... H04W 76/021; H04W 4/001; H04W 4/005; H04W 84/18
See application file for complete search history.

(56) References Cited

U.S. PATENT DOCUMENTS

| 2005/0036505 A1* | 2/2005 | Frei ........................ H04W 74/04 370/442 |
| 2005/0124346 A1* | 6/2005 | Corbett .................. H04W 24/02 455/446 |
| 2010/0149967 A1 | 6/2010 | Johansen |
| 2014/0177505 A1 | 6/2014 | Arkko et al. |

(Continued)

OTHER PUBLICATIONS

"3rd Generation Partnership Project;Technical Specification Group Services and System Aspects; Feasibility study on the security aspects of remote provisioning and change of subscription for Machine to Machine (M2M) equipment (Release 9)", 3GPP Standard; 3GPP TR 33.812, 3rd Generation Partnership Project (3GPP), Mobile Competence Centre; 650, Route Des Lucioles ; F-06921 Sophia-Antipolis Cedex France, No. V9.2.0, Jun. 22, 2010 (Jun. 22, 2010), pp. 1-87, XP050441986, [retrieved on Jun. 22, 2010].

(Continued)

*Primary Examiner* — Luat Phung
(74) *Attorney, Agent, or Firm* — Young & Thompson

(57) ABSTRACT

The invention relates to a method for configuring a device equipped with a subscriber identity module in a mesh network environment. The device is configured retrieve at least one first piece of configuration information from at least one other device in the same mesh network and configure itself at least partly on the basis of the retrieved configuration information. Further, the device is configured to establish a connection to a network node, to indicate presence of the device in the mesh network, and to retrieve at least one second piece of configuration information. Finally, the device is arranged to configure itself on the basis of the retrieved at least one second piece of configuration information received from the network node.

15 Claims, 3 Drawing Sheets

(56) References Cited

U.S. PATENT DOCUMENTS

2015/0142714 A1* 5/2015 Golota .................... H04L 67/10
                                                                 706/23
2016/0037322 A1* 2/2016 Nguyen ................ H04W 76/14
                                                                 370/329
2016/0044665 A1* 2/2016 Novlan ................. H04W 76/14
                                                                  370/336

OTHER PUBLICATIONS

EP Search Report, dated Apr. 13, 2015, from corresponding EP application.

* cited by examiner

CONFIGURATION OF A DEVICE

TECHNICAL FIELD

The invention concerns in general the technical field of machine-to-machine (M2M) communication. Especially the invention concerns configuration of a M2M device.

BACKGROUND OF THE INVENTION

Machine-to-Machine (M2M) communication refers to a concept in which devices are arranged to communicate with each other through a communication network. Especially, M2M communication is an implementation in a broader concept called Internet of Things in which the fundamental idea is to enable interconnection of computer-like devices through an existing Internet infrastructure. The idea is to harness devices to produce and to provide data and by analyzing the data to add well-being of humans.

In a large extent the M2M communication requires at least that each device coupled in the communication network implements a certain network technology and is identifiable within the network. This enables exchange of data between the entities within the communication network as well as control of the devices belonging to the M2M communication system. At the same time it is straightforward that the management of such as system may be heavy and requires lot of resources.

An example of utilization of the M2M communication may e.g. be controlling and optimized networking of street lightning. The controlling may e.g. be arranged so that one or more street lamps form a controllable sub-entity within the street lightning network, which a provided with a unique identifier within the network and equipped with a communication unit implementing a communication technology of one type or another. The communication technology may be implemented in the sub-entity so that a communication unit, such as a wireless or wired modem, is brought to the sub-entity and through it the exchange of information to and from the network is established. The communication unit is thus configured to receive and to provide e.g. instructions, among other things, to control the operation of the sub-entity and elements, such as individual street lamps, therein. This controlling is possible even from the normal mobile phones of telecommunication network if so allowed, provisioned and authenticated. The communication unit is provided with necessary means, which enable the communication within the network. For example, in case that the communication unit is coupled to a mobile communication network it shall be equipped with a subscriber identity module (SIM), which enables the connection to the mobile communication network in question.

Generally speaking in the wireless sensor networks, such as for street lighting, a controllable sub-entity, such as M2M, sensor or mobile phone device may itself be a device with controlling entity integrated. This controlling entity can comprise features of base station, base station controller, sensor system controller (e.g. for street lights), necessary databases and gateway. With such an entity or a unit it is possible to provide network coverage to a cell (or vicinity nearby) creating hence a microcellular mobile network. Eventually an integrated unit or entity is created with functionalities of a mobile phone or subscription (SIM), base station and controller, sensor for phones and lamps, lamp fixtures and storage as well processing power for databases, routing tables and normal computer platform capabilities.

Some challenges in the above described development are that the management and configuration of the M2M devices and the network or sub-networks get difficult and easily produce lot of communication within the network. Moreover, as the M2M devices are typically using, at least to some extent, resources in the mobile communication network, it is advantageous to develop further the integration of the mentioned entities in order to tackle, at least partly, the challenges in the management and in the configuration of the devices in the M2M environment.

SUMMARY OF THE INVENTION

An objective of the invention is to present a method, a device and a system for configuring a device. Another objective of the invention is that the method, the device and the system for configuring the device is applicable in mesh network environment.

The objectives of the invention are reached by a method, a device and a system as defined by the respective independent claims.

According to a first aspect, a method for configuring at least a device equipped with a subscriber identity module in a mesh network environment is provided wherein the method comprising establishing, by the device, a connection to at least one other device in the same mesh network; retrieving, by the device, at least one first piece of configuration information from the at least one other device in the same mesh network; configuring the device at least partly on the basis of the retrieved at least one first piece of configuration information from the at least one other device in the same mesh network, establishing a connection to a network node accessible at least partly on the basis of subscriber identity module; indicating a presence of the device in the mesh network to the net-work node; retrieving, from the network node, at least one second piece of configuration information; and configuring the device at least partly on the basis of the retrieved at least one second piece of configuration information received from the network node.

The method may further comprise a step of comparing, in the device, if the device comprises a configuration information retrieved from the at least one other device in the same mesh network.

The first piece of configuration information may comprise an identifier of the mesh network.

The at least one first piece of configuration information may comprise configuration information of the at least one other device in the same mesh network.

The device may retrieve the first piece of configuration information from plurality of devices, wherein at least two devices of the plurality of devices residing in different mesh networks.

The at least one second piece of configuration information may comprise information relating to a cooperation of the device with the at least one other device in the mesh network.

The second piece of configuration information may comprise information relating to cooperation of at least two devices in the mesh network is delivered to the at least one other device in the mesh network.

The indication of presence of the device in the mesh network may comprise the identifier of the mesh network.

According to a second aspect, a device equipped with a subscriber identity module for a mesh network environment is provided, the device comprising at least one processor; and at least one memory including portions of computer program code; wherein the processor being configured to cause the device at least to perform: establish a connection to at least one other device in the same mesh network; retrieve at least one first piece of configuration information from the at least one other device in the same mesh network; configure the device at least partly on the basis of the retrieved at least one first piece of configuration information from the at least one other device in the same mesh network; establish a connection to a network node accessible at least partly on the basis of subscriber identity module; indicate a presence in the mesh network to the network node; retrieve, from the network node, at least one second piece of configuration information; and configure the device at least partly on the basis of the retrieved at least one second piece of configuration information received from the network node.

The device may further be configured to compare if the device comprises a configuration information retrieved from the at least one other device in the same mesh network.

The first piece of configuration information may comprise an identifier of the mesh network.

The at least one first piece of configuration information may comprise configuration information of the at least one other device in the same mesh network.

The device may be configured to retrieve the first piece of configuration information from plurality of devices, wherein at least two devices of the plurality of devices residing in different mesh networks.

The at least one second piece of configuration information may comprise information relating to a cooperation of the device with the at least one other device in the mesh network.

The device may be configured to provide at least the identifier of the mesh network in the indication of presence of the device in the mesh network.

According to a third aspect, a system for configuring a device equipped with a subscriber identity module is provided, wherein the system comprises a mesh network comprising at least one other device operating in the mesh network; a network node accessible at least partly on the basis of subscriber identity module; and within the system the device is configured to: establish, a connection to at least one other device in the same mesh network; retrieve at least one first piece of configuration information from the at least one other device in the same mesh network; configure the device at least partly on the basis of the retrieved at least one first piece of configuration information from the at least one other device in the same mesh network; establish a connection to the network node; indicate a presence in the mesh network to the network node; retrieve at least one second piece of configuration information from the network node; and configure the device at least partly on the basis of the retrieved at least one second piece of configuration information received from the network node.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF DRAWINGS

The embodiments of the invention are illustrated by way of example, and not by way of limitation, in the figures of the accompanying drawings.

DESCRIPTION OF SOME EMBODIMENTS

The present invention relates to a solution for configuring a device equipped with a subscriber identity module provided by a telecommunication operator, wherein the device is considered to belong to a mesh network of M2M devices. The mesh network comprises at least two M2M devices. The M2M devices may e.g. be, but are not limited to, sensors, controller devices, mobile devices, access devices, gateways or similar, which are configured to operate in a manner that the operation of the devices belonging to the same mesh network is at least partly dependent on at least one other device within the same network. The term "mesh network" stands for a network, of such network topology in which all or at least two devices are communicatively connected to each other. Network devices constitute pre-determined network environment according to applied network topology. Connections between devices may comprise fixed line or wireless network connections i.e. Local Area Network (LAN), WiFi/WLAN, short-range radio network etc., any mobile radio network, fixed line or wireless sensor network or any other fixed or wireless network employed by at least two devices. Furthermore, the mesh network comprises, through at least one of the devices belonging to the mesh network, communication interface to an external network to the mesh network, such as mobile communication network.

Figure 1:
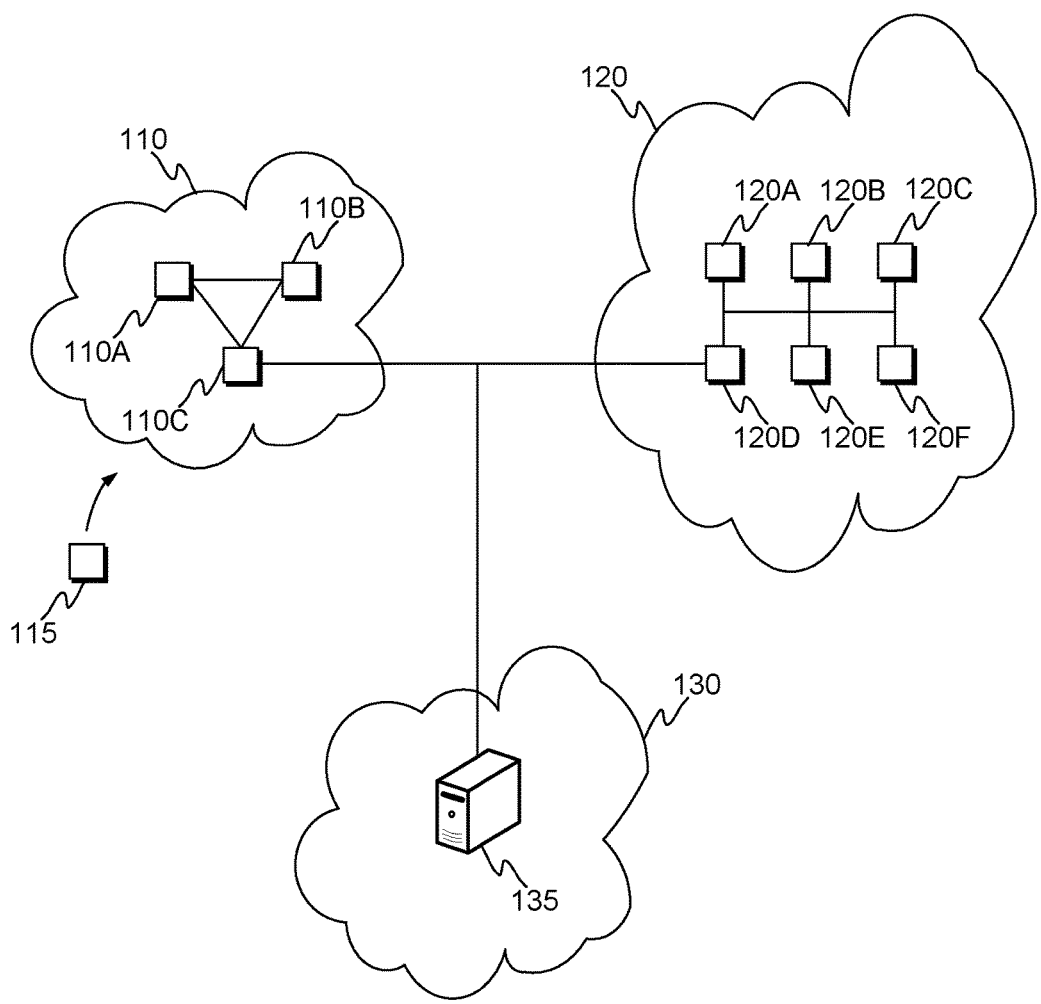
FIG. 1 illustrates schematically an example of an environment in which the invention is applicable.

FIG. 1 illustrates schematically an example of an environment in which the invention is applicable. In the example two mesh networks 110, 120 are established. Each mesh network 110, 120 comprises one or more devices, i.e. M2M devices, performing a predetermined task in the mesh network 110, 120. The first mesh network 110 in FIG. 1 comprises three devices 110A-110C and the second mesh network 120 comprises six devices 120A-120F. The devices inside the mesh networks 110, 120 are communicatively coupled to each other either directly or indirectly. The direct coupling refers to an implementation in which each device has a direct communication channel to all other devices. The indirect coupling refers to an implementation in which at least one device is communicatively coupled to other devices through at least one other device. Furthermore, the mesh networks 110, 120 are communicatively coupled to a network node 135 residing in a mobile communication network 130. The coupling of the mesh networks 110, 120 to the mobile communication network 130 may be implemented either in a wired manner through a known internetworking unit (not illustrated in FIG. 1) or wirelessly through a known radio access network and core network (not illustrated in FIG. 1). The coupling to the mobile communication network 130 may be implemented directly or indirectly through one or more devices within the mesh network 110, 120. Alternatively or in addition, the coupling of the mesh networks 110, 120 to the mobile communication network may be arranged so that the whole mesh network 110, 120 or at least some part of it may be part of the mobile communication network 130. In some implementations it is possible to arrange a separate controller unit in at least some of the mesh networks 110, 120, which is configured to serve the devices within the mesh network 110, 120 in question and also to communicate with the network node 135 residing in the mobile communication network 130 either directly or indirectly through at least one other controller units in other mesh networks. The controller unit may comprise functionalities of a controller, network node and/or devices 110A-110C, 120A-120F. Naturally, the entity or entities within the mesh network being suitable to communicate with the mobile communication network 130 is/are equipped with necessary communication interface and security element, such as a subscriber identity module (SIM), enabling the access to the mobile communication network 130. The SIM may be implemented with a physical integrated circuit as a hardware solution or as a so called embedded SIM solution in which the functionalities of the SIM may be implemented with embedded hardware with applicable software in the entity in question.

A device 115 is arranged to be added to the mesh network 110 in FIG. 1. According to an example of the present invention the device to added comprises a subscriber identity module of a mobile communication network 130 and the device 115 is configured to perform a predetermined functionality with the other devices in the same mesh network, and thus to cooperate therein.

Figure 2:
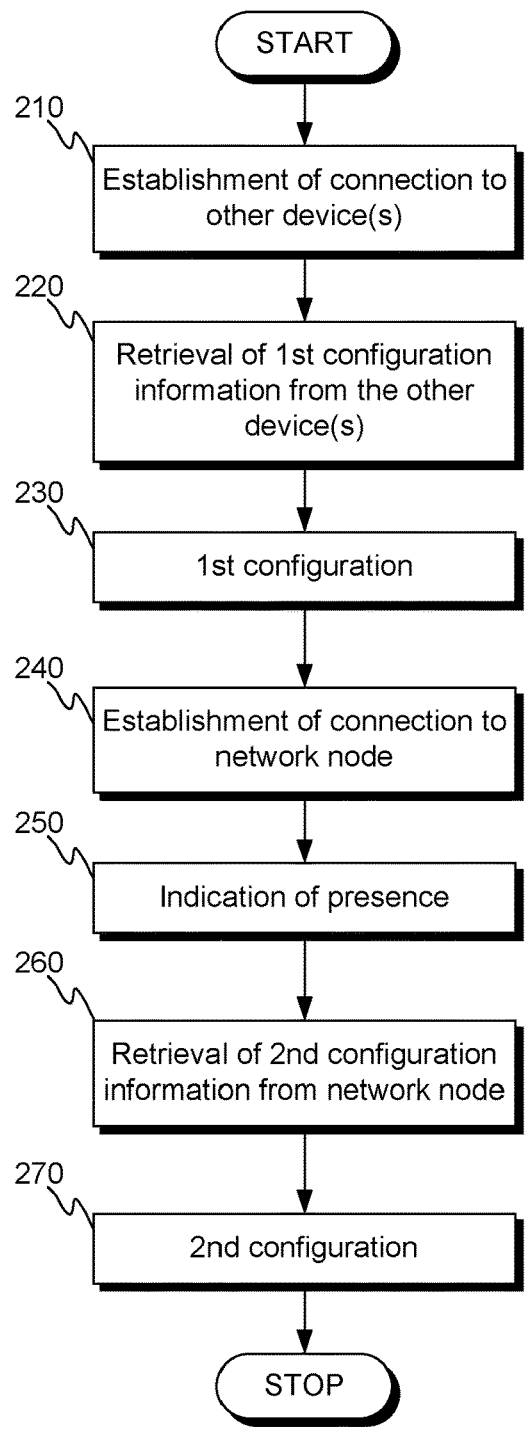
FIG. 2 illustrates schematically a method according to an example of the invention.

Next the solution according to the invention is described by referring to FIG. 2 in which a method according to an example of the invention is disclosed. The method is started in response to importing a new device 115 in a mesh network 110 already comprising at least one other device 110A-110C. The devices already coupled to the mesh network comprise such a configuration that it enables the cooperation of the devices 110A-110C in the mesh network, and if necessary to communicate with the mobile communication network 130. The new device 115 is configured so that it comprises basic installation comprising an operating system and pre-configured device related default and initial settings which enables it to communicate with at least one other device already existing in the mesh network. Further, the new device 115 may comprise a subscriber identity module (SIM) and the device 115 may be pre-configured to utilize the SIM in its communication towards the mobile communication network. Some non-limiting examples of the pre-configured data within the device are IP and/or MAC address mapping capability to mesh network ID, such as device ID (e.g. for street lamp device), SIM characteristic to a mobile telecom device allowing mobile telecommunication network access, mesh network ID or similar.

Now as the device is brought to a communicative vicinity to at least one other device residing in the mesh network into which the device in question is to be coupled to, a communication connection is established 210 between the devices 115; 110A-110C. The communicative vicinity refers to an implementation in which the device 115 may establish a communication connection with any technology to at least one other device 110A-110C. The connection may be established through any short range communication, such as near field communication (NFC), Bluetooth or Wi-Fi (if such a network is available). Moreover, the device may communicate through the mobile communication network with at least one other device 110A-110C if the device already comprises a configuration which enables connection to a mobile communication network with the SIM residing in the device 115.

Furthermore, in some embodiment of the invention the device 115 is provided with at least one of the following: an identifier of the device 115, an identifier of the mesh network or networks, into which the device 115 belongs to, address domain, such as IP address, of the device. The mentioned pieces of information may be stored in a memory of the device, which are therefrom retrievable by a processor of the device and thus deliverable through the communication interface to the at least one other device 110A-110C. Next some non-limiting examples as regards the mentioned identifiers are described:

If the device 115 is provided with the identifier of the device 115 it is advantageously defined in a network node 135 into which mesh network(s) the device belongs to. In order to increase security in the network, or for any other reason, the operation may be arranged so that the new device 115 delivers its device identifier to at least one other device 110A-110C with whom it has established a communication connection and the at least one other device 110A-110C is configured to perform an inquiry towards a network node 135 if the device 115 with the device identifier in question is such a party that it shall be taken to the mesh network and the device 115 shall be configured as will be described or not.

If the device 115 is provided with the identifier of the mesh network the device 115 is advantageously arranged to access to the mesh network directly by delivering the identifier to the at least one other device 110A-110C. The other device 110A-110C may e.g. compare the identifier to an identifier stored in a memory of the other device 110A-110C or inquire the accessibility from the network node, and in response to a match initiate the configuration as will be described.

If the device 115 is provided with the identifier on address domain, such as IP address, the address domain identifier may be delivered to the at least one other device 110A-110C with whom it has established a communication connection and the at least one other device 110A-110C is configured to perform an inquiry towards a network node 135 if the device 115 with the address domain identifier in question is such a party that it shall be taken to the mesh network and the device 115 shall be configured as will be described or not.

Many alternative ways to utilize the identifier, or any combination of them, may be developed.

In response to the establishment of the communication connection between the new device 115 and the at least one other device 110A-110C a step in the configuration of the device may be taken. Namely, the device 115 is configured to retrieve 220 at least one piece of first configuration information from the at least one other device 110A-110C belonging in the same mesh network. Alternatively or in addition, the device 115 may be configured to retrieve the one, or even multiple pieces, of configuration information from multiple other devices 110A-110C. This may be the case especially, when the new device 115 is performing multiple functions within the mesh network and needs configuration information from multiple devices 110A-110C already in the mesh network. In some further embodiment of the invention the device is configured to retrieve the first piece, or pieces, of configuration information from plurality of devices, wherein at least two devices of the plurality of devices reside in different mesh networks. In such a case the new device is arranged to be added in multiple mesh networks for performing dedicated tasks in each of the mesh networks. In response to retrieval of the $1^{st}$ configuration information the device 115 performs the configuration 230 with the configuration information.

The piece(s) of configuration information from the at least one other device comprises advantageously basic data relating to functionalities of the mesh network. The functionalities comprise, but are not limited to, device and mesh network related data in order to integrate the new device in the mesh network in question. In other words, the new device may now operate in the mesh network in a similar manner as the at least one other device performing the same function as the new device in the mesh network. According to an implementation of the invention the device 115 retrieves an identifier of the mesh network 110 from the at least one other device in the same mesh network. This is especially the case when the device 115 is not provided with a mesh network identifier beforehand.

When the first configuration is performed 230 in the device 115 the device 115 is arranged to establish a connection 240 to a network node 135 accessible at least partly on the basis of subscriber identity module residing in the device. In other words the device 115 is configured to establish the connection, in one embodiment of the invention, through a mobile communication network 130. Thus, the network node 135 comprises a network address in order to be accessible to the device 115. The device 115 may comprise the network address pre-defined in a memory of the device 115 or alternatively, or even in addition, it may receive it from the at least one other device 110A-110C when the first piece of configuration information is retrieved. The network address of the network node 135 may e.g. be a MSISDN ("Mobile Station International Subscriber Directory Number"), IP address or anything similar.

In the connection the device 115 is configured to indicate a presence of the device 250 in the mesh network to the network node. In this manner the network node 135 receives information that a set-up of the mesh network 110 is changed due to addition of the device 115 in the mesh network. The indication of the presence of the device 115 in the mesh network 110 comprises advantageously an identifier of the device 115 and/or an identifier identifying the mesh network 110 to the network node 135. The device 110 may also be identified from the subscriber identity module when the network node 135 is arranged to maintain a data structure, or access the data structure, on each subscriber identity module coupled to devices to be arranged in the mesh networks.

The network node 135 is configured to retrieve information on the mesh network structure and its operation from a data structure into which it has an access. From the data structure the network node 135 is configured to retrieve a second piece of configuration information 260 for the device 115 and to deliver it to the device 115. The delivery and thus the receipt of the configuration information 260 may be performed over the same communication connection, which was established in step 240 or through another connection if desired. Finally, the device is configured to perform the configuration with the second configuration information 270.

The second piece of configuration information comprises configuration information which further defines the operation of the new device 115 in the mesh network. At least one aim of the second piece of configuration information is to adjust the operation of the new device so that it is optimal in the mesh network. For example, if the device 115 is a sensor with a certain beam, the second piece of configuration information may adjust the width of the beam so that it does not overlap with some other sensor beam within the same area. Thus, at least in some implementation of the invention the at least one second piece of configuration information comprises information relating to a cooperation of the device with the at least one other device in the mesh network. When the second piece of information is retrieved by the device and the device is configured accordingly, the cooperation of the device with at least one other device in the mesh network is improved.

According to some further embodiment of the invention the network node 135 may be configured to, by means of pre-defined rules, to define the new structure of the mesh network and to control the operation of at least one earlier device 110A-110C in the mesh network 110 so that the new device 115 and the at least one other device 110A-110C in the same mesh network cooperate optimally. This may be achieved so that the network node 135 is configured to, in response of the receipt of the indication of presence of the new device 115 in the mesh network, to define at least one other device belonging to the same mesh network and to create a second piece of configuration information to be delivered to the new device and to the at least one other device in the same mesh network. As a result the operation of the devices is defined and redefined. This kind of arrangement is advantageous e.g. when there are multiple devices performing the same operation in the mesh network and it is preferred that the operations of the devices do not overlap with each other. A practical example of such a situation may e.g. when a new sensor, such as a camera, is brought to premises wherein already one similar sensor exists. Thus, it is advantageous to control through configuration the operation of these two sensors in a manner as described.

Figure 3:
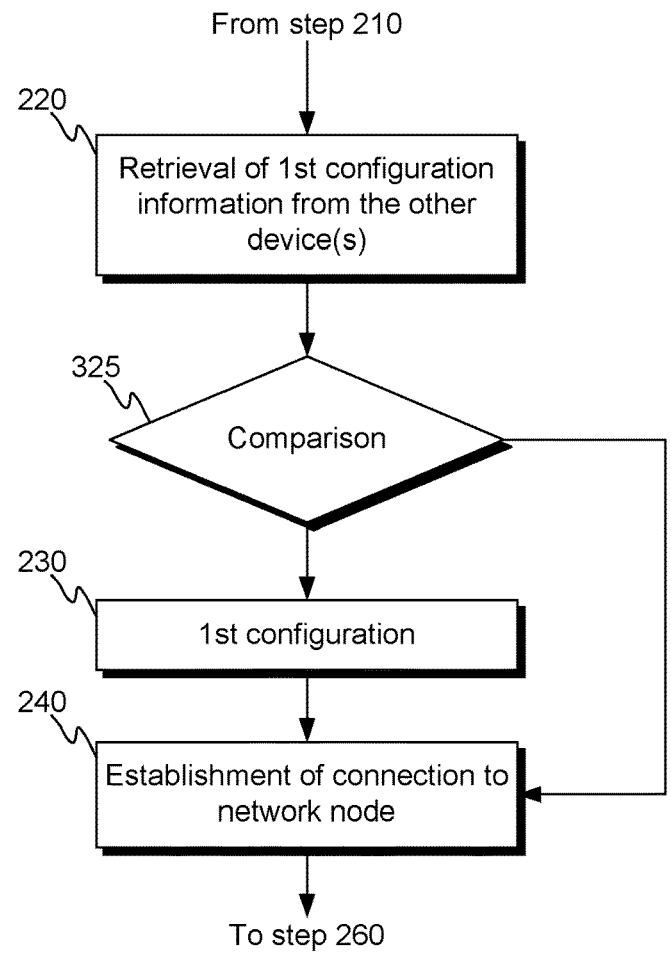
FIG. 3 illustrates schematically a further aspect relating to the method according to the invention.

FIG. 3 illustrates a further aspect relating to the method according to the invention. Namely, in order to avoid any unnecessary configuration of the new device 115 a comparison step 325 may be arranged between the described steps 220 and 230. In the comparison it is compared if the new device 115 already comprises, as pre-installed, the configuration information retrieved from the at least one other device 110A-110C. The device 115 is arranged to retrieve the $1^{st}$ configuration information from the at least one other device and to compare at least some portion of the retrieved configuration information to pre-installed pieces of information in the device 115. If the comparison 325 indicates that the device 115 does not comprise the first configuration information the device configures 230 itself accordingly, as described. If the comparison indicates that the device 115 already comprises the retrieved $1^{st}$ configuration information, no any configuration is performed and the device initiates the connection to the network node 240.

Figure 4:
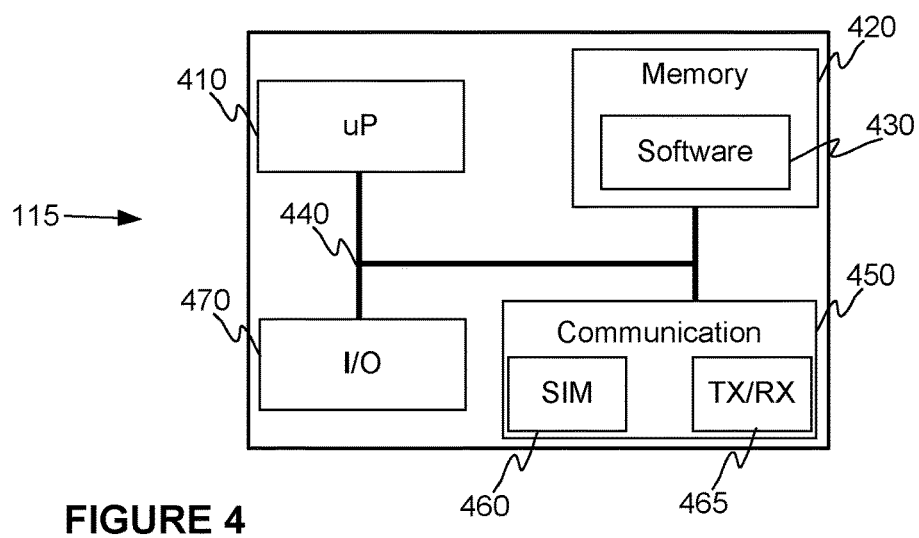
FIG. 4 illustrates schematically a device according to an embodiment of the invention.

FIG. 4 illustrates a device 115 according to an embodiment of the invention. The device 115 comprises computer bus 440 that couples one or more processors 410, memory 420 including portions of computer program code 430 that e.g. comprises device application and functionalities, input/output (I/O) devices 470, a communication interface 450 comprising subscriber identity module 460 and transmit/receive TX/RX unit 465. The I/O devices 470 refers to any necessary input/output units by means of which it is possible to input and output data to and from the device. The I/O devices 470 may also comprise elements specific to the device 115 in order to operate in a mesh network in question. Such element may e.g. be applicable sensors. The communication interface 450 comprises network adapters and antennas, which are necessary to implement the communication of the device 115 as described herein. The subscriber identity module (SIM) 460 is embedded in the communication interface 450 in order to provide access to the mobile communication network. The device may comprise some additional elements, such as power source, which are not disclosed in FIG. 4 for clarity reasons. The devices 110A-110C in the same network may, or may not be, similar to the device as depicted in FIG. 4.

The device of FIG. 4 may comprise the following functionalities implemented with the mentioned units within the device together with applicable software:

A normal mobile communication device functionalities with features of a public mobile telecommunication network (i.e. UMTS, LTE, etc.) such as
  Versatile, currently rather standard, communication capabilities including calls, messaging, location services (GPS), video camera and recording
  Application processor
  Data storage capability (e.g. for database), flash memory and SRAM or similar integrated to store the device configuration
  Power management for energy efficiency of the device
Controller functionalities of integrated base station, base station and sensor network controller with their standard capabilities such as
  Transcoding of speech channels
  Allocation of radio channels
  Paging and location management
  Transmission and reception of communication over air interface
  Radio resource management
  Admission and authorization
  Measurement, roaming and handover controls
  IP connectivity and routing
  Data forwarding and transactions
  Database and data storage to store and furnish device configuration to devices in the vicinity thus possessing server platform capability
  Monitoring, management and control of wireless sensor based network (such as street lighting network)
Sensor system components and features physically connected to the device of FIG. 4 may include components such as
  Sensor node and physical parts such as lamp fixtures and LED lamps as street lights; and
  Environmental sensors integrated; and
  Physical facilitation of wireless radio communication coverage such as street lighting masts The list above is for purposes to indicate the versatile functionalities of the device 115. In other words, not all listed functionalities are necessary in all implementations. For example, the sensor system is not necessary embedded in the device 115, but it may be external to the device 115 and coupled with a known communication interface to the device.

The network node 135 comprises one or more processors, one or more memories and necessary communication interfaces in order to operate in the mobile communication interface towards the typical network elements of the mobile communication network, but also to external devices. Further, the network node 135 comprises access to one or more databases storing information e.g. relating to mesh networks and their setup, as disclosed in the description. Alternatively or in addition, the network node 135 comprises access to data storage, such as a database, comprising instructions how a mesh network an devices therein shall operate in specific network topology. This enables establishment of the $2^{nd}$ configuration information to be delivered at least to the new device 115 brought in the mesh network.

The invention also relates to a system in which a new device 115 is to be added to a mesh network 110 comprising at least one other device 110A-110C.

Within the system the device 110 is configured to perform the method as described with the other entities, i.e. at least one other device in one or more mesh networks and at least one network node 135.

Among other things as already discussed above the configuration of the device relates to modifying the device in such a manner that it may be import in at least one mesh network for performing specific tasks. The modification may relate, but is not limited to, installing pieces of software in the device and modifying operational parameters in the device in response to retrieval of configuration information from at least one other device in some mesh network or from a network node. Thus, the configuration information comprises such data, which may be utilized by the device for configuration purposes.

Furthermore, the description above discloses that the device 115 is configured to establish the connection primarily wirelessly through a mobile communication network to the network node. However, the connection may also be established through a wired connection and by utilizing authentication related operations provided by the mobile communication network.

Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. A method for configuring a device equipped with a subscriber identity module in a mesh network with configuration information enabling cooperation of the device and at least one other device in the mesh network, the method comprising:
  establishing, by the device, a connection to the at least one other device in the same mesh network;
  retrieving, directly by the device, at least one first piece of the configuration information from the at least one other device in the same mesh network;
  configuring the device at least partly based on the retrieved at least one first piece of configuration information from the at least one other device in the same mesh network to cause an integration of the device in the same mesh network;
  establishing a connection to a network node accessible at least partly on the basis of subscriber identity module, the network node being external to the mesh network;
  indicating a presence of the device in the mesh network to the network node;
  receiving, by the device, a network address of the network node from the at least one other device when the first piece of the configuration information is retrieved;
  retrieving, by the device, at least one second piece of the configuration information from the network node through a mobile communication network; and
  configuring the device at least partly based on the retrieved at least one second piece of configuration information received from the network node to enable cooperation of the device and the at least one other device in the mesh network by optimizing an operation of the device in the same mesh network.

2. The method of claim 1, further comprising comparing, in the device, when the device comprises configuration information retrieved from the at least one other device in the same mesh network.

3. The method of claim 1, wherein the first piece of configuration information comprises an identifier of the mesh network.

4. The method of claim 1, wherein the at least one first piece of configuration information comprises configuration information of the at least one other device in the same mesh network.

5. The method of claim 1, further comprising retrieving, by the device, the first piece of configuration information from a plurality of devices, and
wherein at least two devices of the plurality of devices reside in different mesh networks.

6. The method of claim 1, wherein the second piece of configuration information comprises information relating to cooperation of at least two devices in the mesh network that is delivered to the at least one other device in the mesh network.

7. The method of claim 1, wherein the indication of the presence of the device in the mesh network comprises the identifier of the mesh network.

8. The method of claim 1, wherein the configuration information includes device and mesh network-related data of the at least one other device, and
the configuring the device at least partly based on the retrieved at least one first piece of configuration information from the at least one other device in the same mesh network to cause the integration of the device in the same mesh network allows the device to operate in the mesh network similarly to the at least one other device performing a same function as the device in the mesh network.

9. A device equipped with a subscriber identity module for a mesh network, the device being configured with configuration information enabling cooperation of the device and at least one other device in the mesh network, the device comprising:
at least one processor; and
at least one memory including portions of computer program code;
wherein the processor is configured to cause the device at least to:
establish a connection to the at least one other device in the same mesh network,
retrieve at least one first piece of the configuration information directly from the at least one other device in the same mesh network,
configure the device at least partly on the basis of the retrieved at least one first piece of configuration information from the at least one other device in the same mesh network to cause an integration of the device in the same mesh network,
establish a connection to a network node accessible at least partly based on a subscriber identity module, the network node being external to the mesh network,
indicate a presence in the mesh network to the network node,
receive, by the device, a network address of the network node from the at least one other device when the first piece of the configuration information is retrieved,
retrieve, by the device, at least one second piece of the configuration information from the network node through a mobile communication network, and
configure the device at least partly based on the retrieved at least one second piece of configuration information received from the network node to enable cooperation of the device and the at least one other device in the mesh network by optimizing an operation of the device in the same mesh network.

10. The device of claim 9, wherein the device is further configured to compare when the device comprises configuration information retrieved from the at least one other device in the same mesh network.

11. The device of claim 9, wherein the first piece of configuration information comprises an identifier of the mesh network.

12. The device of claim 9, wherein the at least one first piece of configuration information comprises configuration information of the at least one other device in the same mesh network.

13. The device of claim 9, wherein the device is configured to retrieve the first piece of configuration information from a plurality of devices, and
wherein at least two devices of the plurality of devices reside in different mesh networks.

14. The device of claim 9, wherein the device is configured to provide at least the identifier of the mesh network in the indication of the presence of the device in the mesh network.

15. A system for configuring a device equipped with a subscriber identity module with configuration information enabling cooperation of the device and at least one other device in a mesh network, the system comprising:
the mesh network comprising the at least one other device operating in the mesh network; and
a network node accessible at least partly based on the subscriber identity module,
wherein within the system the device is configured to:
establish, a connection to at least one other device in the same mesh network,
retrieve at least one first piece of the configuration information directly from the at least one other device in the same mesh network,
configure the device at least partly based on the retrieved at least one first piece of configuration information from the at least one other device in the same mesh network to cause an integration of the device in the same mesh network,
establish a connection to the network node, the network node being external to the mesh network,
indicate a presence in the mesh network to the network node,
receive, by the device, a network address of the network node from the at least one other device when the first piece of the configuration information is retrieved,
retrieve at least one second piece of configuration information by the device from the network node through a mobile communication network, and
configure the device at least partly based on the retrieved at least one second piece of the configuration information received from the network node to enable cooperation of the device and the at least one other device in the mesh network by optimizing an operation of the device in the same mesh network.

* * * * *